United States Patent [19]
Waldbusser

[11] Patent Number: 6,138,708
[45] Date of Patent: Oct. 31, 2000

[54] MASS FLOW CONTROLLER HAVING AUTOMATIC PRESSURE COMPENSATOR

[75] Inventor: Edwin Waldbusser, Virginia Beach, Va.

[73] Assignee: Controls Corporation of America, Virginia Beach, Va.

[21] Appl. No.: 09/362,561

[22] Filed: Jul. 28, 1999

[51] Int. Cl.[7] .................................................... G05D 7/06
[52] U.S. Cl. ....................... 137/341; 137/486; 137/487.5
[58] Field of Search ................................. 137/341, 486, 137/487.5

[56] References Cited

U.S. PATENT DOCUMENTS 5,687,759 11/1997 Tan .................................... 137/487.5

*Primary Examiner*—Gerald A. Michalsky
*Attorney, Agent, or Firm*—Miles & Stockbridge P.C.; John C. Kerins; Edward J. Kondracki

[57] ABSTRACT

The present invention is directed to a mass flow controller having an automatic pressure compensator in the form of a dome loaded pressure regulator, wherein the dome loaded pressure regulator is, in turn, controlled by a dome-loading gas line regulated by a pilot pressure regulator. The pilot pressure regulator and the mass flow controller are advantageously controlled by a single microprocessor, and may advantageously all be mounted to a single manifold block.

11 Claims, 2 Drawing Sheets

MASS FLOW CONTROLLER HAVING AUTOMATIC PRESSURE COMPENSATOR

BACKGROUND OF THE INVENTION

1. Field of the Invention

The present invention relates to mass flow control devices, or mass flow controllers, used in industrial gas delivery systems. More specifically, the invention relates to automatic pressure compensation to maintain a pressure differential across a mass flow controller, within predetermined limits.

2. Description of Related Art

Mass flow controllers (MFCs) are commonly employed in semiconductor manufacturing facilities to control the mass flow rates of various gases required to be supplied to pieces of manufacturing equipment. A high degree of precision is required for MFCs used in such service, as accurate control of the gas delivery is very important in maintaining the quality and consistency of the semiconductor elements produced by the equipment.

One of the characteristics of the operation of a mass flow controller is that a differential pressure is created across the MFC between the inlet or supply line side and the outlet side of the MFC, as a result of the MFC operating to maintain a substantially constant mass flow rate for the gas exiting the MFC. A major problem with MFCs that have been developed, or have been proposed for development, in the past has been that reliable operation of the MFC is not obtained due to inadequate control over the differential pressure established across the MFC. Generally, such control has required manual adjustments to the system to return the pressure differential to a stable operational value.

U.S. Pat. No. 5,129,418, issued to Shimomura et al. presents one example of a mass flow controller design which attempts to achieve improved performance and operation by monitoring operational conditions other than the flow rate, such as pressure and temperature, at designated places in the system, in order to provide output data to an operator. It is suggested that the operator would be able to troubleshoot or perform certain diagnostics while the MFC is in operation using this design. The disclosed advantage of this system is that abnormalities in operation can be found prior to the flow rate being disturbed to facilitate the planning of maintenance or component trade outs.

Other patents directed to mass flow controllers have adopted microprocessor control of the flow regulation of the MFC. Generally, such patents have employed the microprocessor control in order to implement fuzzy logic or other artificial intelligence controls for the controller.

Notwithstanding the existence of these various microprocessor-controlled systems, there continues to exist a need for a mass flow controller having increasingly reliable and stable operation. More specifically, a need exists for a mass flow controller device that does not require manual control of a pressure regulator, the output of which serves as the input to the MFC, when the MFC output becomes unstable.

It is therefore a principal object of the present invention to provide a mass flow control device having automatic adjustment of the differential pressure across the MFC in order to achieve a more stable output from the mass flow controller.

It is an additional principal object of the present invention to provide a mass flow control device in which an output signal of the mass flow control device is monitored and analyzed to determine the stability of the signal, and in which an automated control system adjusts the device as necessary to maintain a stable output.

It is a further important object of the present invention to provide a mass flow control device having means for maintaining a temperature of an incoming gas at or near a temperature used in calibrating the mass flow controller.

SUMMARY OF THE INVENTION

The above and other objects of the present invention are realized in the present invention by the provision of a mass flow controller which employs a process pressure regulator to control the pressure differential across the mass flow controller, with the process pressure regulator itself being controlled by a second, microprocessor-controlled pressure regulator. In addition, the MFC employs microprocessor-controlled monitoring of an output signal of the MFC to test the signal for stability. When instability in the signal is detected, the microprocessor automatically sends a control signal to the pilot pressure regulator, which operates to control the process pressure regulator to adjust the differential pressure across the mass flow controller to a value within a stable operating range.

Another feature of the present invention includes employing a single microprocessor to perform all microprocessor control and monitoring required by the system. In addition, the MFC may employ a heater for the process pressure regulator, which, together with temperature control circuitry, can operate to maintain the process gas at a temperature corresponding to the temperature at which the MFC was initially calibrated.

DETAILED DESCRIPTION OF THE PREFERRED EMBODIMENT

Figure 1:
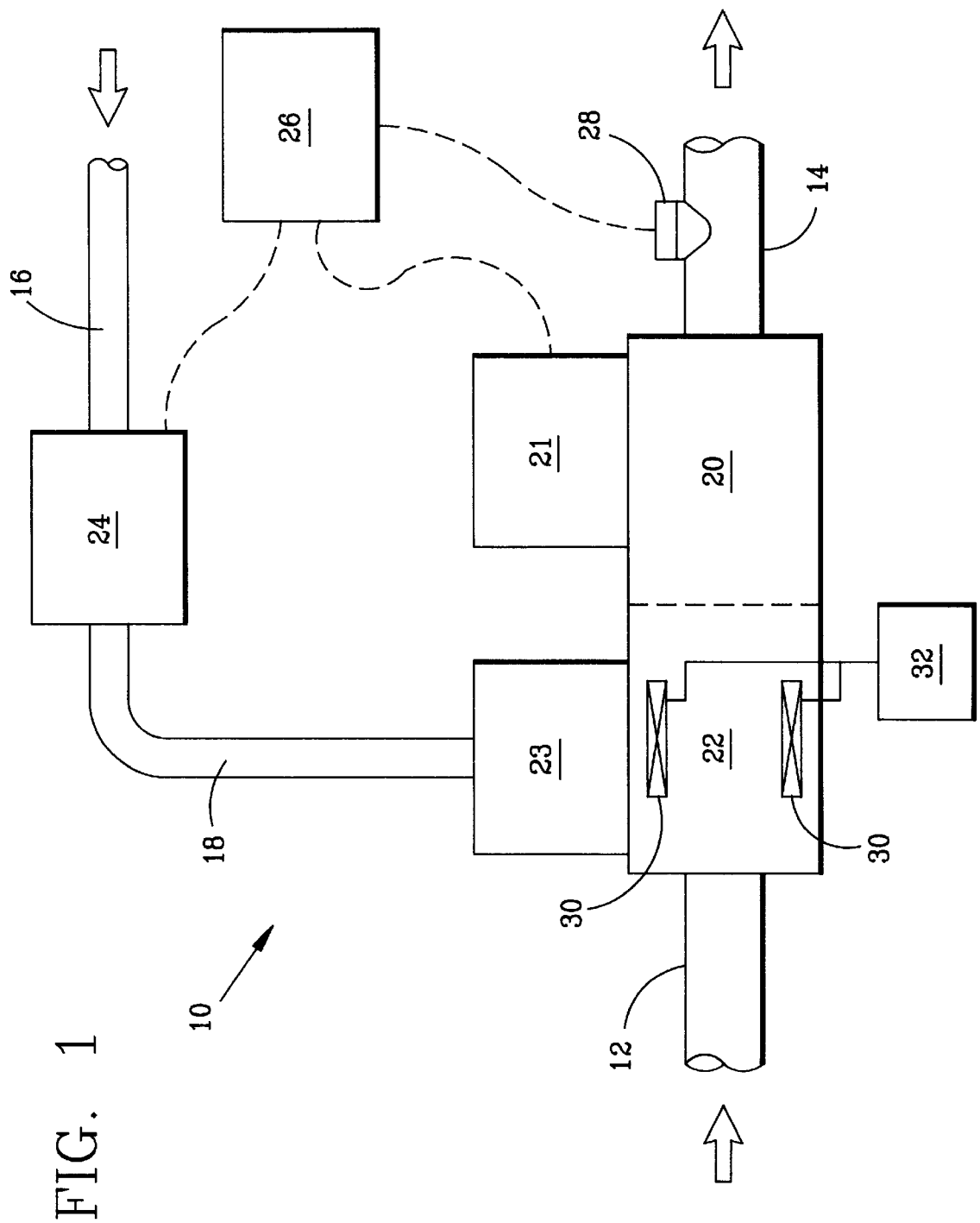
FIG. 1 is a substantially schematic block diagram view of the mass flow controller in accordance with a preferred embodiment of the present invention.

FIG. 1 illustrates, in block diagram form, a preferred embodiment of the mass flow control system 10 of the present invention. A process gas input line 12 delivers a flow of a process gas, which is to be subsequently introduced into a piece of equipment (not shown), to the mass flow control system. A process gas output line 14 is connected to the output side of mass flow control system 10, and carries the process gas at the desired mass flow rate to a downstream device, for example, to the aforenoted piece of process equipment.

Mass flow control system 10 preferably comprises a mass flow controller 20, and a dome loaded process pressure regulator 22, the operations of which are well known in the art. As illustrated in FIG. 1, in a preferred embodiment, these two components may be formed in and of a single block of material (typically, stainless steel), as a space-saving and particle contamination reducing measure. The mass flow controller section is provided with a package of mass flow control electronics 21, as will be readily understood in the art.

Figure 2:
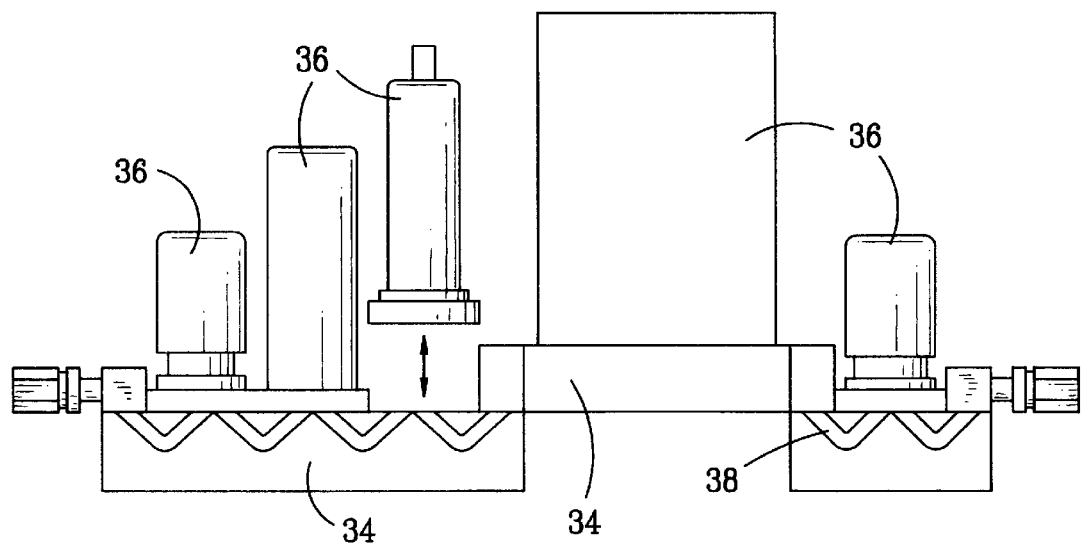
FIG. 2 is a substantially schematic view of the components of the present invention as assembled to a common manifold.

Alternatively the bodies of both components, and others in the complete gas control system (complete system not illustrated) could be part of a manifold which combines the bodies of all system components. Such a system is made operational by bolting topworks of each component to a single manifold 34 (FIG. 2). Several such systems are commercially available, differing mainly in the approach taken to seal the topworks 36 (shown generically) to the manifold body 34. Within the manifold block, v-shaped fluid passages 38 are provided to allow the desired components to be in fluid communication with one another. An example is the system produced by Unit Instruments, Yorba Linda, CA marketed as "The Z-Block Modular Gas System".

Figure 3:
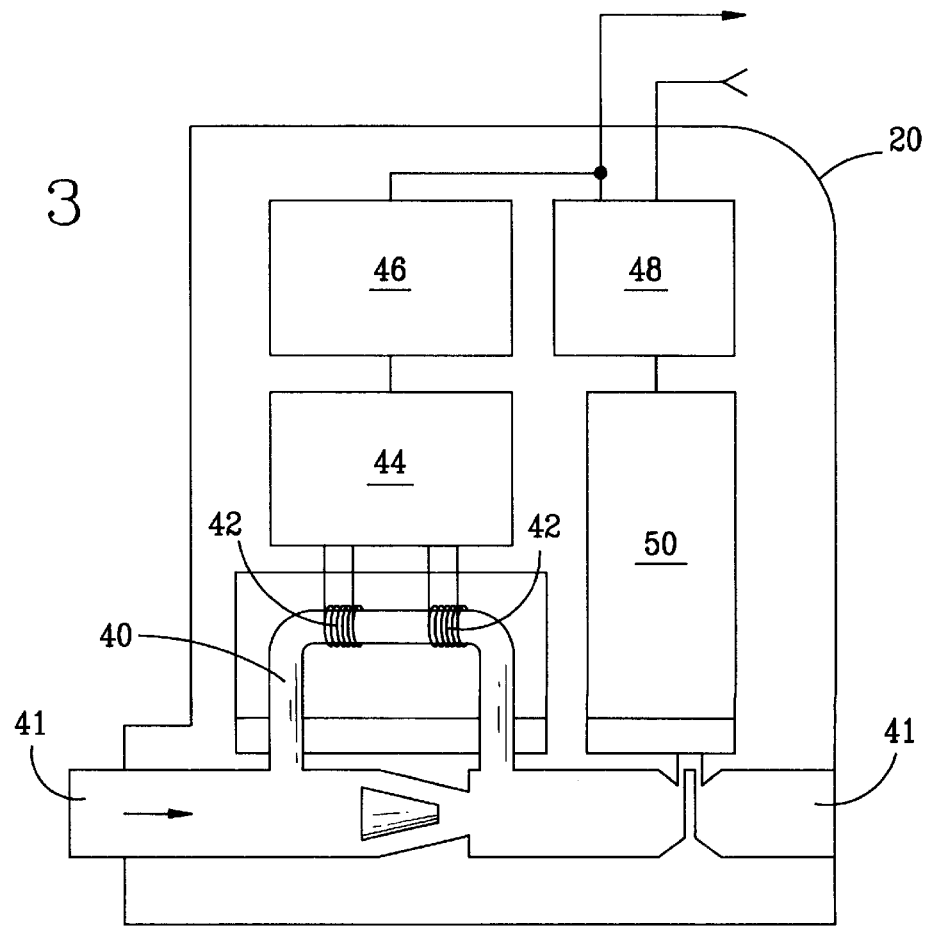
FIG. 3 is a substantially schematic block diagram illustrating the function and control of a typical thermal mass flow controller.

FIG. 3 shows, in block diagram form, the components of a typical thermal mass flow controller 20. A small bore tube or capillary 40 with two resistance thermometer elements 42 receives a constant proportion of the main flow from a process gas flow line 41. The tube 40 is heated by applying an electric current to the elements. The cooling effect of the flowing gas creates a temperature differential between the two elements. The change in resistance due to the temperature differential is measured as an electrical signal. This temperature differential is dependent on the mass flow of the gas and is a function of its density, specific heat and flow rate. The temperature differential electrical signal is linearized and amplified by the bridge circuit 44 and amplifier circuit 46. This signal is compared to the setpoint signal in the comparator control circuit 48. The error signal from the comparator directs the control valve 50 to open or close to maintain a constant flow at the setpoint level.

The dome-loaded process pressure regulator 22 operates to deliver the process gas at a desired pressure selected such that a pressure differential is established across the mass flow controller 20. The pressure differential is employed by the mass flow controller to receive process gas which is generally not delivered at a constant mass flow rate, and to discharge the process gas at a desired constant mass flow rate. Proper operation of the mass flow controller 20 requires that this pressure differential be maintained within certain defined limits, based upon the specific configuration of the mass flow controller 20 and upon the desired mass flow rate of the process gas discharged from the mass flow controller 20.

In the course of delivering the process gas at a constant mass flow rate to downstream equipment, operating conditions can cause the pressure differential established across the mass flow controller 20 to exceed the upper limit of a stable operating range, and can cause the MFC output to become unstable. A rise in differential pressure could be caused by unexpected changes in flow demand from the downstream process equipment, which might change the pressure downstream of the mass flow meter due to the mentioned flow change, and thus also change the pressure upstream of the mass flow controller due to flow regulation effects in the pressure regulator. Both of these effects are well known to those skilled in the are of pressure regulation. In prior mass flow control systems, such differential pressure excursions required manual intervention to adjust a process pressure regulator such that its output of process gas, which is the input to the MFC 20, is changed slightly in order to bring the pressure differential across the MFC back within the desired range.

The present invention employs a second pressure regulator 24, and a microprocessor controller 26 controlling the pressure regulator, to automatically control and adjust the gas output pressure of process pressure regulator 22. This microprocessor controller 26 is operatively coupled to, and monitors or tests the MFC output signal, illustrated in FIG. 1 as comprising a delivery pressure transducer 28.

Microprocessor controller 26 has stored in memory therein, or in an external memory, an algorithm that enables the microprocessor to determine or to make a decision regarding the stability of the MFC output signal. The algorithm determines whether the output signal is stable or unstable, based upon criteria such as signal amplitude or frequency, or a combination of both. Upon determining that the MFC output signal has become unstable, the microprocessor sends a signal to the pressure regulator 24, which, through the use of a supply of control air in control air line 16, can adjust the pressure of the air in dome-loading air line 18. The pressure of the air in dome-loading air line sets the dome-loading pressure in the dome 23 of process pressure regulator 22, and thus, an adjustment in the pressure in dome-loading air line 18 effected by control of pressure regulator 24, operates to adjust the process gas pressure flowing through process pressure regulator 22, thereby adjusting the differential pressure across MFC 20 to a value within a range of stable operation.

The pilot pressure regulator 24 may be a dome-loaded type pressure regulator, or may alternatively be of any type of pressure regulator currently available as an off-the-shelf component.

In this mass flow control system 10, the MFC is also preferably operatively coupled to a microcontroller to calculate a mass flow from process gas measurements made by the MFC and its electronics package 21. In the illustrated preferred embodiment, the three control functions discussed above, namely, the testing of the MFC output signal for stability, the control of the dome-loading pressure with pilot pressure regulator 24, and the mass flow calculation, are all performed by a single microcontroller 26. This allows for more economical manufacture and packaging of the device. As noted previously, the MFC 20 and the process pressure regulator 22 may preferably be incorporated in a shared manifold block, to reduce the size of the device, and possibly to reduce the cost of manufacture of the device.

A further aspect of the present invention addresses another significant problem with reliable MFC operation, a problem occurring as a result of the temperature of the incoming process gas differing from the temperature at which the MFC 20 was initially calibrated. Most often, the temperature difference is that the incoming process gas is at a lower temperature than the gas temperature used in calibrating the MFC 20. This can occur from thermodynamic effects on the flow through the pressure regulator.

Accordingly, the preferred embodiment of the present invention has one or more temperature control elements in the form of heating elements 30 embedded in the mass of the pressure regulator body. Alternatively, the heating elements 30 could be attached to (e.g. external to) the mass of the pressure regulator body. The heating elements 30 are operatively coupled to a temperature control circuit 32 of a standard design that will be employed to control the heating elements such that the process gas exiting the process pressure regulator will be substantially at the temperature at which the MFC 20 was calibrated. As a result of maintaining the temperature of the process gas at that temperature increased accuracy of gas delivery and reliability are obtained.

It is to be understood that the foregoing description of the preferred embodiment of the present invention is for illustrative purposes, and many variations may become apparent to persons of ordinary skill in the art upon reading this disclosure and viewing the figure forming a part of this disclosure. Such variations do not depart from the spirit and scope of the present invention, and the scope of the invention is to be determined by reference to the appended claims.

What is claimed is:

1. A mass flow control apparatus comprising:

a mass flow controller having an input and an output;

a dome loaded process pressure regulator having an input for receiving incoming process gas, and an output operatively coupled to said input of said mass flow controller, for delivering process gas to said mass flow controller at a regulated pressure;

a pilot pressure regulator operatively coupled at an outlet side thereof to said dome-loaded process pressure regulator by a dome-loading air line, said pilot pressure regulator further being operatively coupled at an inlet side thereof to a source of pressurized gas not part of a process gas line;

a microprocessor controller operatively coupled to a mass flow controller output signal generator, and further operatively coupled to a control of said pilot pressure regulator for adjusting a dome-loading pressure regulated by said dome-loading regulator in response to said mass flow controller output signal.

2. A mass flow control apparatus as recited in claim 1 further comprising means for determining a stable/unstable state of said mass flow controller output signal, and for adjusting said dome-loading pressure by a predetermined amount upon detection of an unstable output signal.

3. A mass flow control apparatus is recited in claim 2, wherein said mass flow controller output signal generator comprises a delivery pressure transducer.

4. A mass flow control apparatus as recited in claim 1, wherein said dome-loaded process pressure regulator further comprises at least one temperature control element for controlling a temperature of process gas passing therethrough.

5. A mass flow control apparatus as recited in claim 4, further comprising a temperature control means for detecting a temperature of said process gas, and for adjusting said at least one temperature control element to bring the temperature of the process gas to a predetermined temperature.

6. A mass flow control apparatus as recited in claim 4, wherein said at least one temperature control element comprises at least one heating element.

7. A mass flow control apparatus as recited in claim 6, wherein said at least one heating element is embedded in a mass of said process pressure regulator.

8. A mass flow control apparatus as recited in claim 6, wherein said at least one heating element is attached to said process pressure regulator.

9. A mass flow control apparatus as recited in claim 1, wherein said mass flow controller and said dome-loaded process pressure regulator are formed in a single manifold block.

10. A mass flow control apparatus as recited in claim 1, wherein a single microprocessor controller is operatively coupled to said mass flow controller output signal generator, and said pilot pressure regulator, and wherein said detection of said output signal and said control of said dome-loading pressure regulator are effected by said single microprocessor controller.

11. A mass flow control apparatus as recited in claim 10, wherein said microprocessor controller is further operatively coupled to said mass flow controller and calculates a mass flow from process gas measurements.

* * * * *